(12) United States Patent
Cooper et al.

(10) Patent No.: US 6,550,195 B1
(45) Date of Patent: Apr. 22, 2003

(54) FLOOR SYSTEM

(75) Inventors: Robert V. Cooper, Holland, MI (US); Joseph R. Branc, Grand Rapids, MI (US); Thomas G. Feldpausch, Hastings, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/713,602

(22) Filed: Nov. 15, 2000

Related U.S. Application Data

(63) Continuation of application No. 09/093,996, filed on Jun. 9, 1998, now Pat. No. 6,202,374.

(51) Int. Cl.[7] .............................. E04B 5/48; E04C 2/52
(52) U.S. Cl. .................. 52/220.3; 52/220.2; 52/220.8; 52/239; 52/126.5; 52/126.3; 52/263
(58) Field of Search .............................. 52/263, 220.1, 52/220.5, 220.8, 126.2, 126.5, 126.6, 220.3

(56) References Cited

U.S. PATENT DOCUMENTS

| | | | |
|---|---|---|---|
| 3,279,134 A | 10/1966 | Donovan ..................... | 52/126 |
| 3,318,057 A | 5/1967 | Norsworthy ................. | 52/126 |
| 3,470,663 A | 10/1969 | Tate ............................ | 52/126 |
| 3,811,237 A | 5/1974 | Bettinger .................... | 52/126 |
| 3,852,928 A | 12/1974 | Raith .......................... | 52/263 |
| 3,924,370 A | 12/1975 | Cauceglia et al. ........... | 52/126 |
| 3,971,181 A | 7/1976 | Zetlin ......................... | 52/263 |
| 4,016,357 A | 4/1977 | Abrahamsen ................ | 174/48 |
| 4,067,156 A | 1/1978 | Downing, Jr. .............. | 52/126 |
| 4,074,488 A | 2/1978 | Ray, III ...................... | 52/263 |
| 4,203,268 A | 5/1980 | Gladden, Jr. et al. ........ | 52/630 |
| 4,220,808 A | 9/1980 | Fujita ......................... | 174/48 |
| 4,250,674 A | 2/1981 | Feist .......................... | 52/220 |
| 4,296,574 A | 10/1981 | Stephens ..................... | 52/27 |
| 4,319,520 A | 3/1982 | Lanting et al. .............. | 98/37 |

(List continued on next page.)

OTHER PUBLICATIONS

Photographs of Promotional Materials for "Herforder raised flooring system" (8 photographs on 4 sheets) date unknonw (materials believed to have been obtained by one of the Applicants in or about Jun., 1994.
Advertisement: InterfaceAR, Interstitial System (2 pages)—date unknown.
Description of Raised Flooring System—MMQB "At the Show—Interplan '96", bearing the date Nov. 18, 1996.
Advertisement: Walker, RCI RC 900 Quad Flush Poke–Thru—date unknown.

*Primary Examiner*—Robert Canfield
(74) *Attorney, Agent, or Firm*—Foley & Lardner

(57) ABSTRACT

The floor system for a work environment providing for access to utilities to be associated with articles such as articles of furniture is disclosed. The floor system includes a plurality of floor tiles. At least one of the floor tiles provides an access pattern. A floor is formed by selective arrangement of the plurality of floor tiles with at least one access point for utilities provided by the access pattern of at least one of the plurality of floor tiles. At least one article of furniture is selectively positioned on the floor. At least one access point can be selectively located within the floor. The position of at least one article of furniture on the floor and location of the access point of the floor are at least partially coincident and access to utilities can be provided through the floor to the article of furniture regardless of the position of the article of furniture on the floor.

60 Claims, 17 Drawing Sheets

U.S. PATENT DOCUMENTS

| | | | | |
|---|---|---|---|---|
| 4,353,411 A | | 10/1982 | Harter et al. | 165/48 R |
| 4,411,121 A | | 10/1983 | Blacklin et al. | 52/792 |
| 4,596,095 A | | 6/1986 | Chalfant | 52/126.6 |
| D285,044 S | * | 8/1986 | Mockett | |
| 4,606,156 A | | 8/1986 | Sweers et al. | 52/126.6 |
| 4,621,468 A | | 11/1986 | Likozar | 52/126.6 |
| 4,630,417 A | | 12/1986 | Collier | 52/263 |
| 4,676,036 A | | 6/1987 | Bessert | 52/126.6 |
| 4,682,453 A | | 7/1987 | Holmgren | 52/126.6 |
| 4,730,363 A | * | 3/1988 | Asbaghi | |
| 4,748,789 A | | 6/1988 | Hedley | 52/792 |
| 4,835,924 A | | 6/1989 | Blacklin et al. | 52/263 |
| 4,850,163 A | | 7/1989 | Kobayashi et al. | 52/126.6 |
| 4,874,127 A | | 10/1989 | Collier | 236/49.5 |
| RE33,220 E | | 5/1990 | Collier | 52/263 |
| 4,922,668 A | | 5/1990 | Payne | 52/221 |
| 4,934,116 A | | 6/1990 | Frederiksen | 52/173 R |
| 5,049,700 A | | 9/1991 | Kobayashi et al. | 174/48 |
| 5,052,157 A | | 10/1991 | Ducroux et al. | 52/126.6 |
| 5,057,647 A | | 10/1991 | Bogden et al. | 174/48 |
| 5,082,712 A | | 1/1992 | Starp | 428/95 |
| 5,167,047 A | * | 12/1992 | Plumley | |
| 5,184,438 A | | 2/1993 | Takeda et al. | 52/221 |
| 5,187,907 A | | 2/1993 | Takeda et al. | 52/221 |
| 5,245,805 A | | 9/1993 | Takeda et al. | 52/126.6 |
| 5,263,289 A | | 11/1993 | Boyd | 52/220.2 |
| 5,341,614 A | | 8/1994 | Shimizu | 52/220.1 |
| 5,389,737 A | | 2/1995 | Kobayashi et al. | 174/48 |
| 5,392,571 A | | 2/1995 | Greenfield | 52/126.2 |
| 5,440,841 A | | 8/1995 | Greenfield | 52/126.2 |
| 5,467,609 A | | 11/1995 | Feeney | 62/259.2 |
| 5,477,649 A | | 12/1995 | Bessert | 52/263 |
| 5,483,776 A | | 1/1996 | Poppe | 52/220.3 |
| 5,499,476 A | | 3/1996 | Adams et al. | 52/220.1 |
| 5,675,949 A | | 10/1997 | Forslund et al. | 52/220.7 |
| 5,768,840 A | | 6/1998 | Feldpausch et al. | 52/239 |
| 5,784,843 A | | 7/1998 | Greer et al. | 52/220.7 |
| 5,927,030 A | | 7/1999 | Petit et al. | 52/220.1 |

* cited by examiner

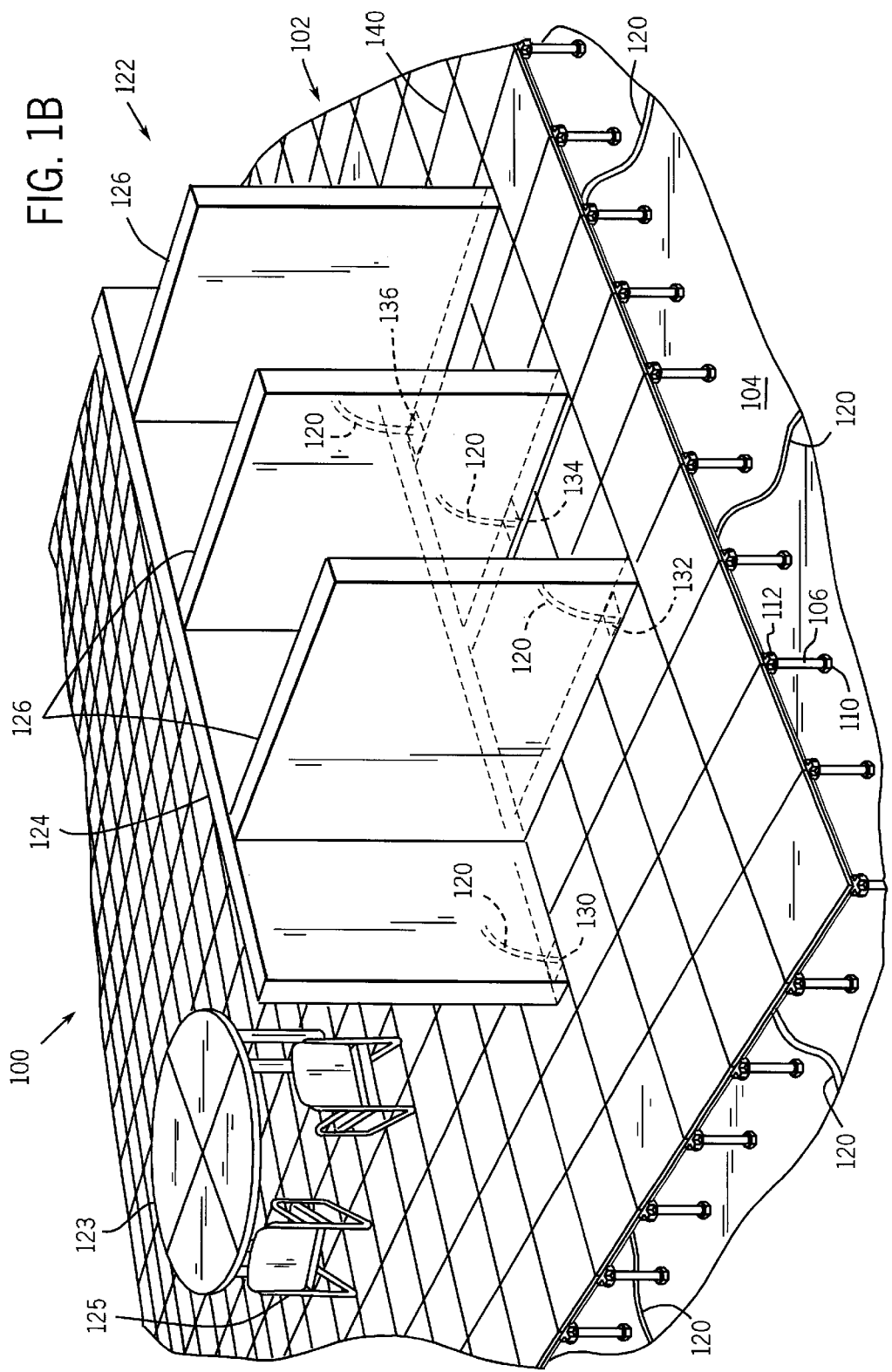

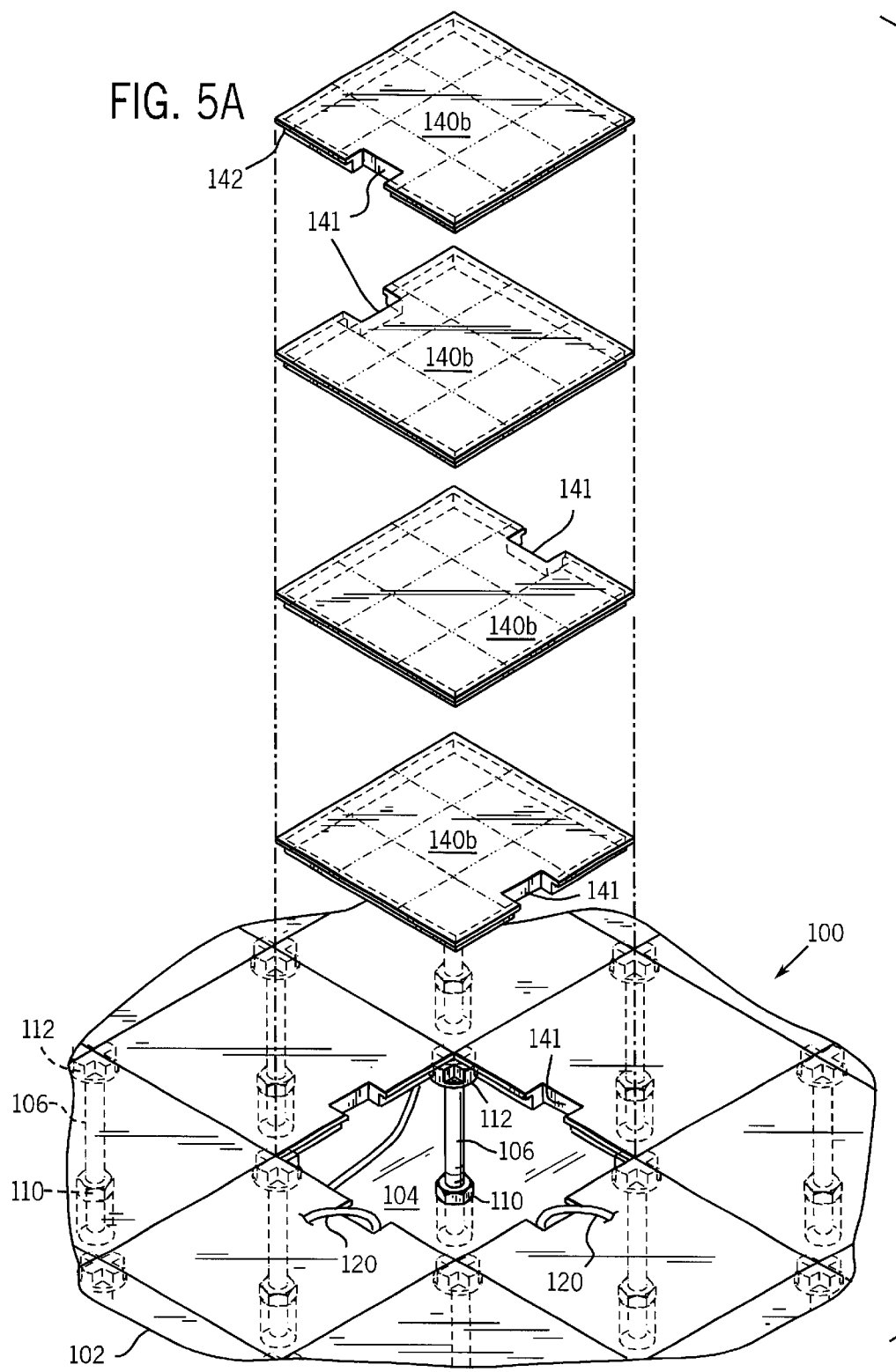

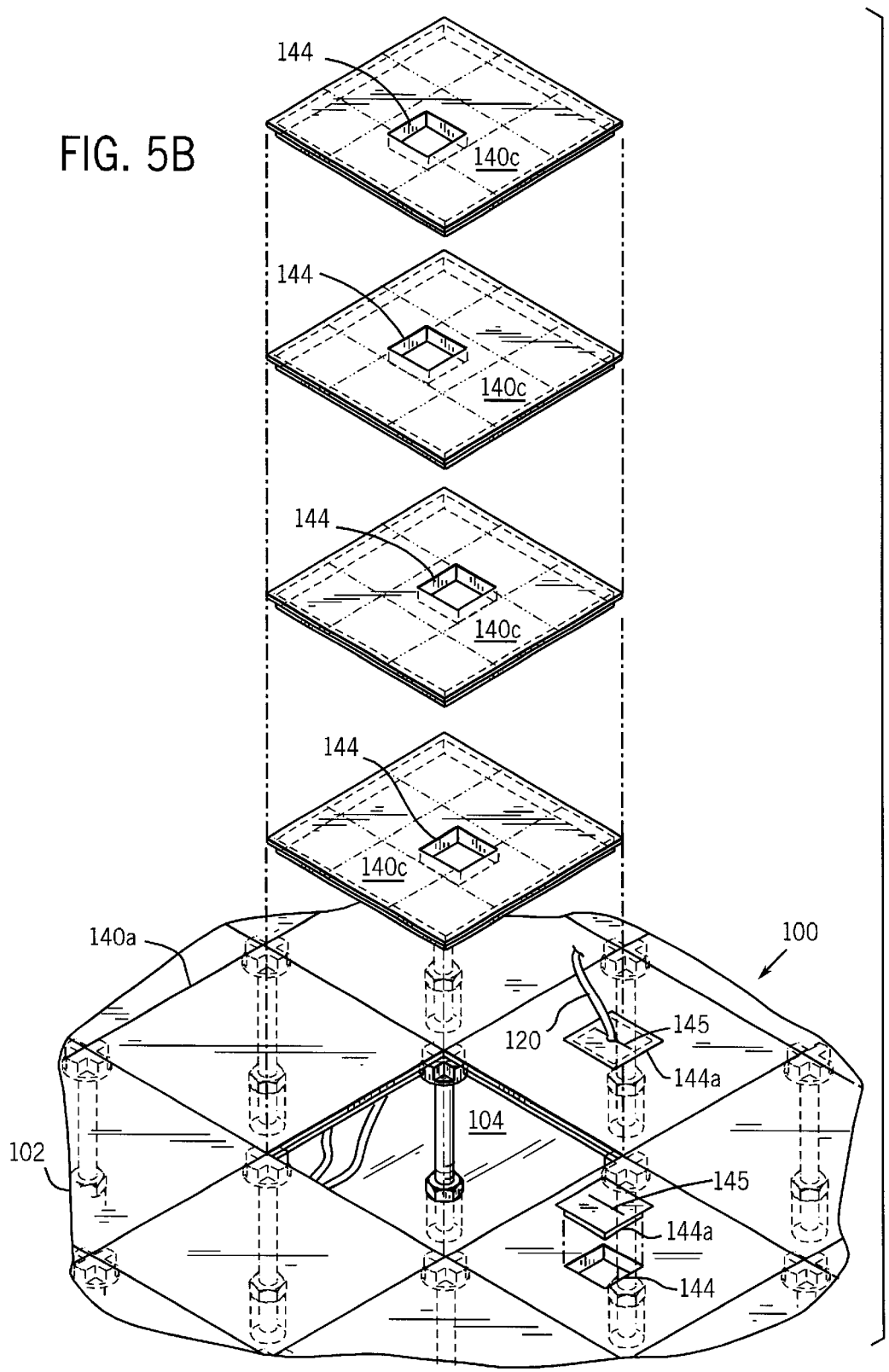

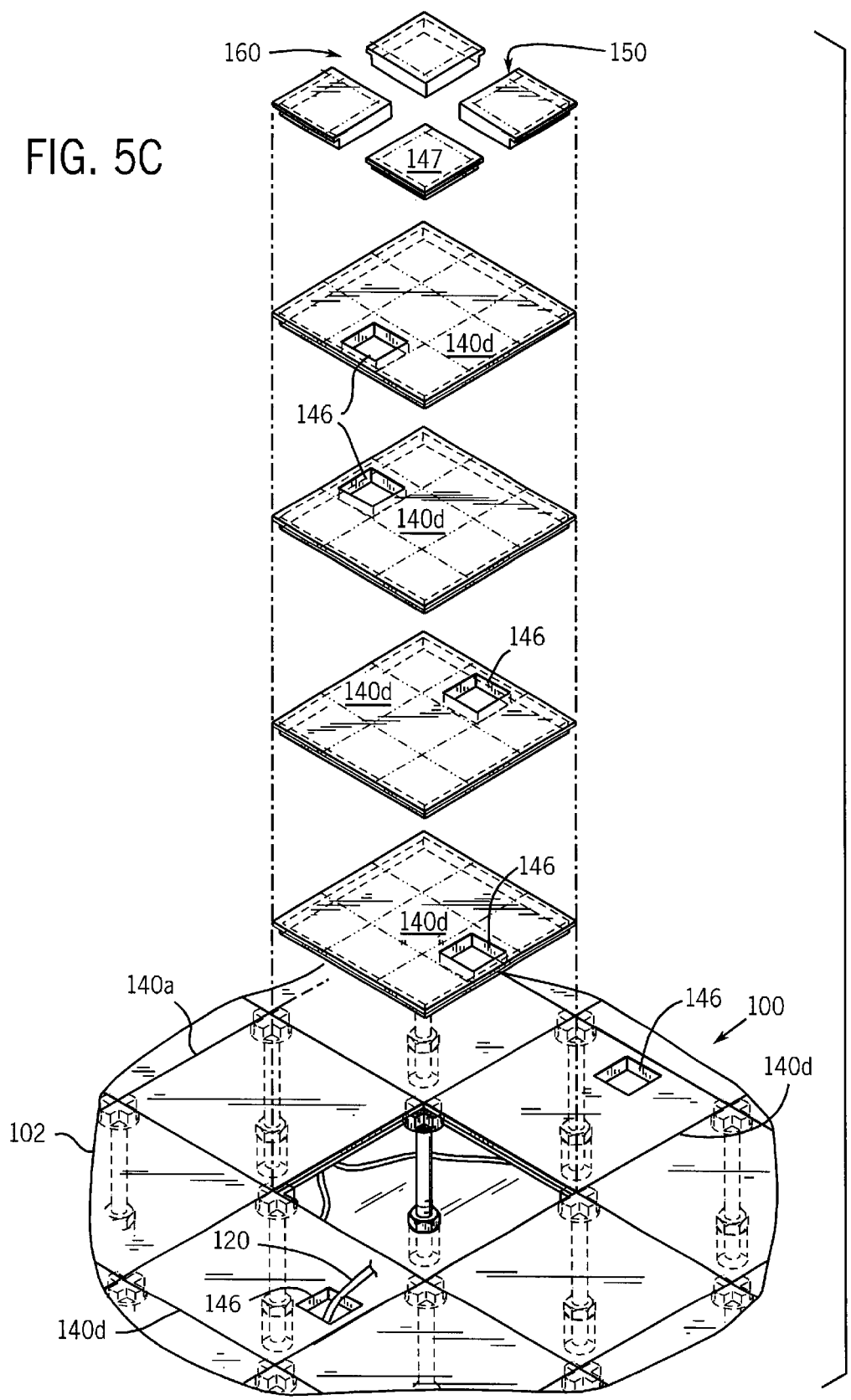

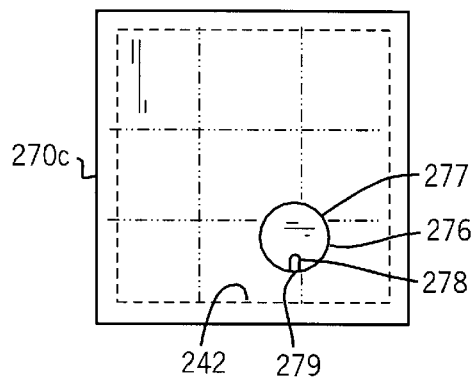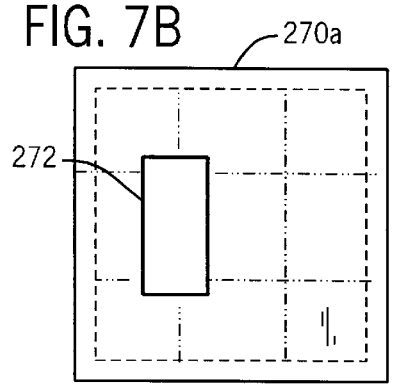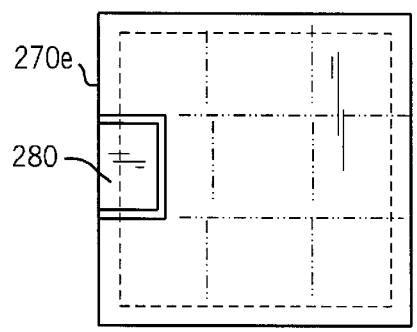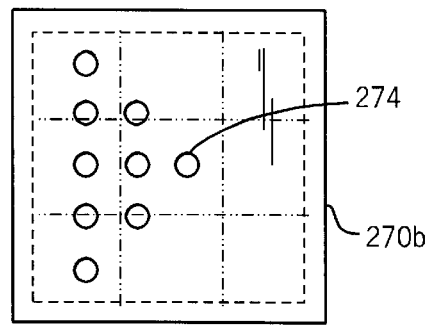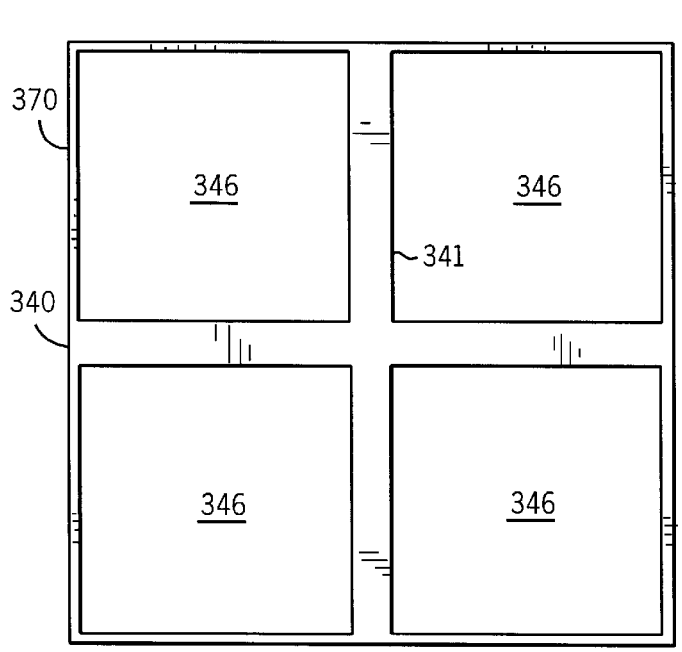

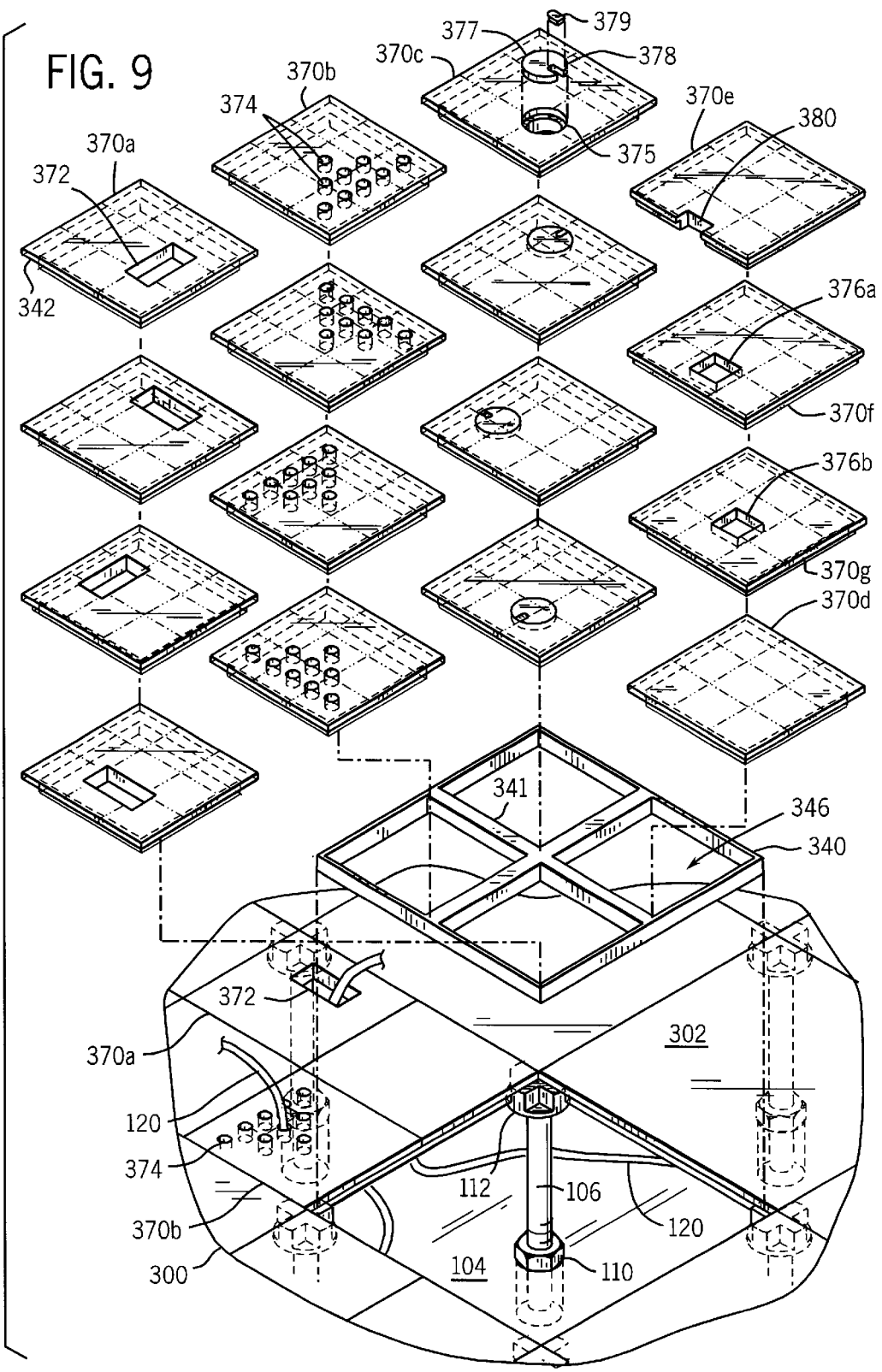

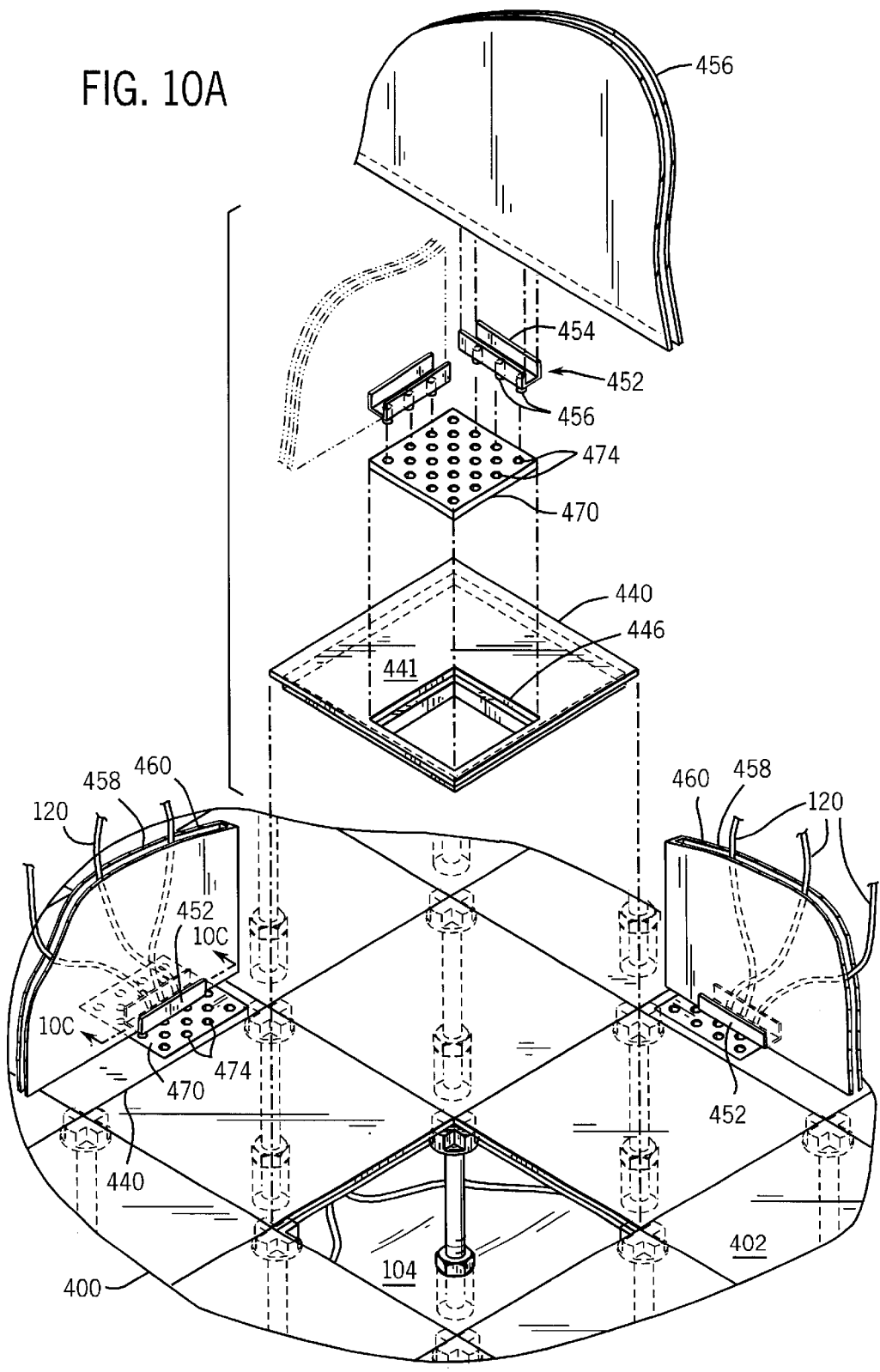

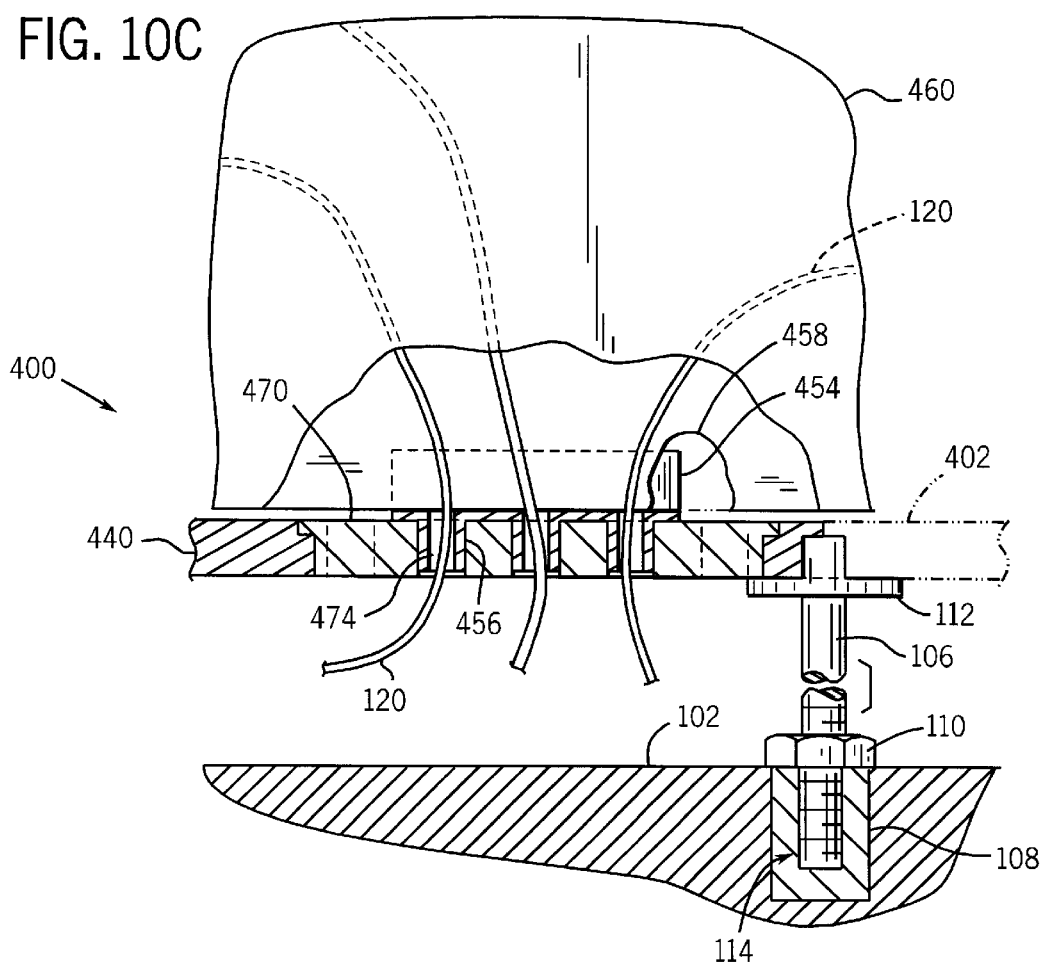
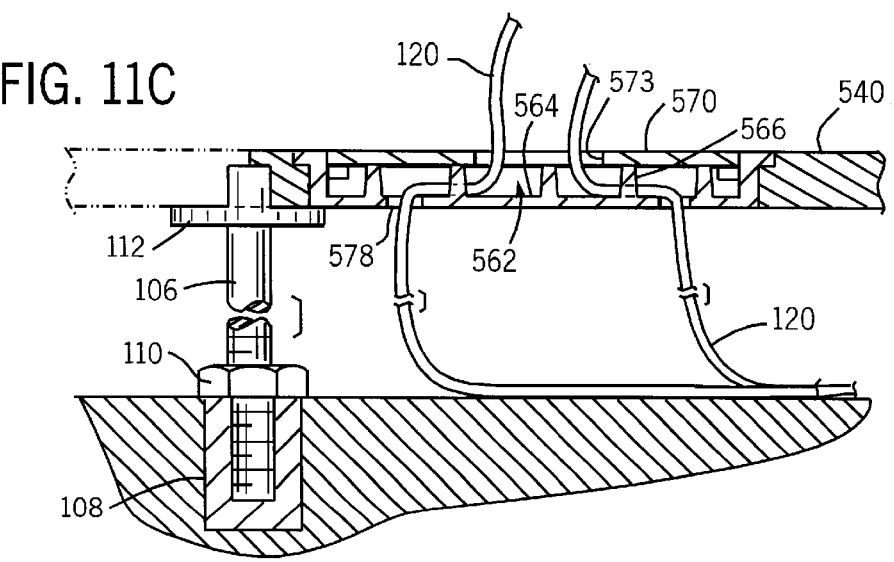

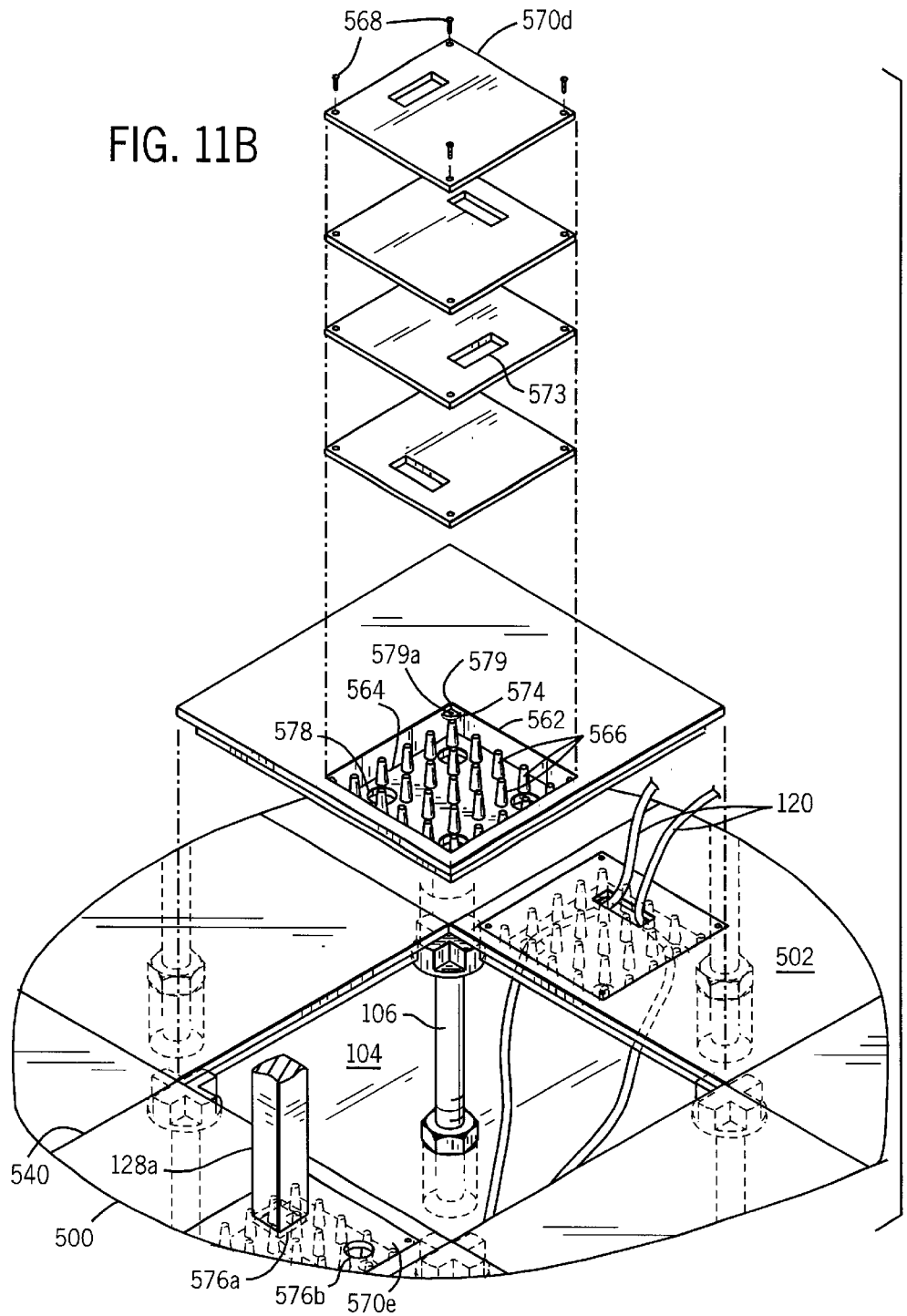

FIG. 12A
FIG. 12B
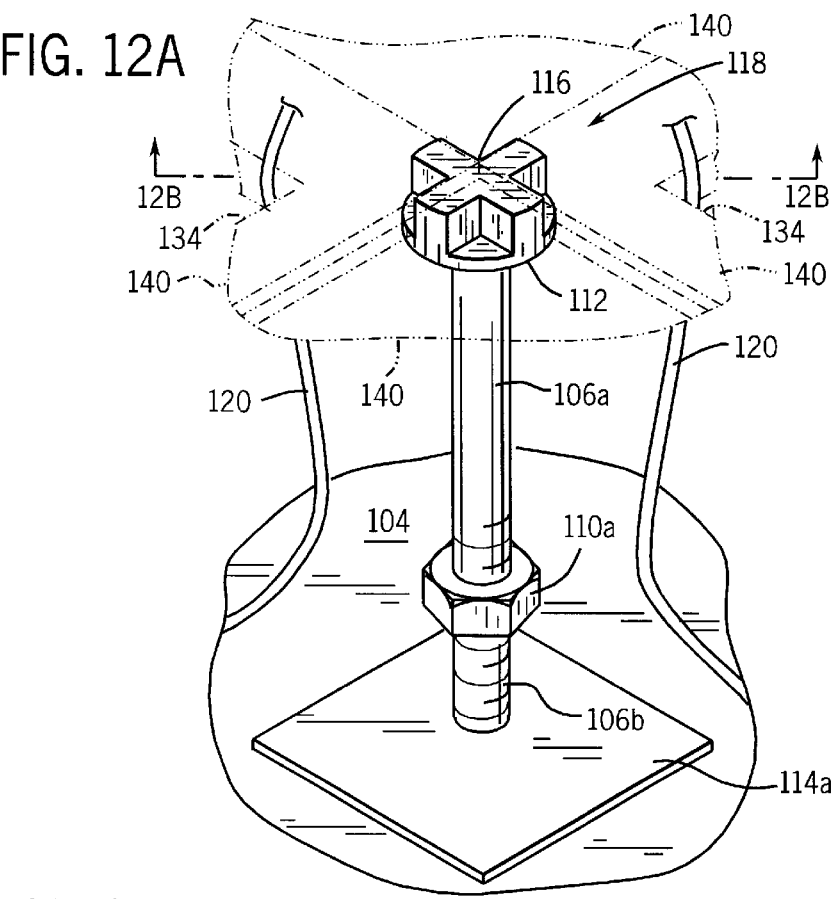
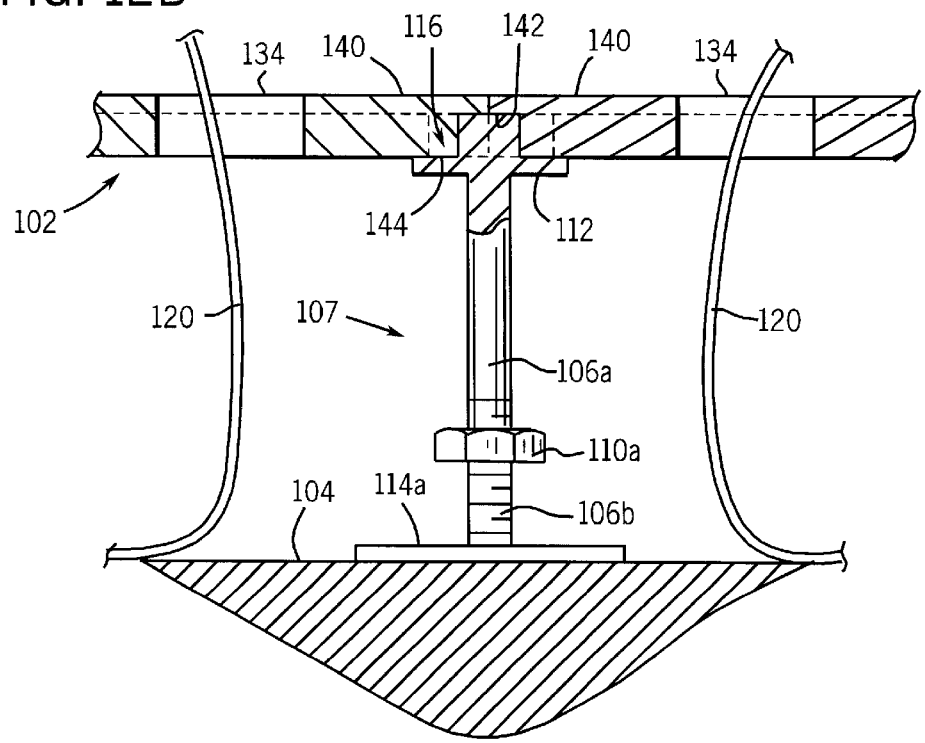

FLOOR SYSTEM

CROSS-REFERENCE TO RELATED APPLICATIONS

The present application is a continuation of application Ser. No. 09/093,996 titled "FLOOR SYSTEM" filed Jun. 9, 1998 now U.S. Pat. No. 6,202,374, which is incorporated by reference herein.

FIELD OF THE INVENTION

The present invention relates to a floor system. In particular, the present invention relates to a floor system including a floor with floor tiles providing an access pattern with at least one access point so that the position of at least one article such as an article of furniture on the floor and the location of the access point of the floor can be made at least partially coincident and access to utilities can be provided through the floor to the article of furniture regardless of the position of the article of furniture on the floor.

BACKGROUND OF THE INVENTION

It is well known to provide for a work environment or space that includes articles of furniture (and other articles), such as systems furniture (e.g. panel walls), cabinets, worksurfaces, desks, tables, chairs or other seating products, posts or other utility or activity products, storage products, frames or other structures, lighting products, etc. Such articles may be freestanding, mounted or secured to a floor and/or to internal walls of the work environment or space or secured together, depending upon needs and nature of the particular application or installation.

It is also known to provide in the work environment for a floor system that includes a raised floor, typically composed of floor tiles, on which the articles of furniture are supported standing above a base floor (made of concrete or the like) and wherein utilities such as telephony, data, power and HVAC may be routed in a horizontal space created between the base floor and the raised floor, typically out of sight. According to such known arrangements for floor systems, access to utilities is typically provided at specific, fixed locations within the floor system, and thus the articles must be arranged on the raised floor in locations that are at least in part dictated by the specific, fixed locations of access to utilities within the floor system. While it is desirable to maintain utilities out of sight (i.e. below the raised floor), in certain applications, it is undesirable to have the potential location of articles of furniture and/or equipment limited by the fixed, specific location of access points in the floor system for utilities.

Accordingly, it would be advantageous to provide for a floor system for a work environment or space that does not limit the potential location of articles such as articles of furniture due to the fixed, specific location of access points for utilities. It would also be advantageous to have a floor system that includes a raised floor composed of floor tiles that can readily be configured during installation and thereafter reconfigured to provide for access points for utilities at a wide variety of locations. It would further be advantageous to have a floor system that provides articles such as articles of furniture with access to utilities at such access points so as to facilitate an optimal utilization of the work environment or space. It would further be advantageous to have a readily configurable and reconfigurable floor system including a floor with floor tiles providing an access pattern with at least one access point so that the position of at least one article such as an article of furniture on the floor and the location of the access point of the floor can be made at least partially coincident and access to utilities can be provided through the floor to the article of furniture regardless of the position of the article of furniture on the floor. It would further be advantageous to have a floor system of a type that is of sufficient structural strength and functionality for the work environment.

SUMMARY OF THE INVENTION

The present invention relates to a floor system which includes a plurality of floor tiles, with at least one of the floor tiles providing an access pattern. A floor is formed by selective arrangement of the plurality of floor tiles, with at least one access point for utilities provided by the access pattern of at least one of the plurality of floor tiles. At least one article of furniture is selectively positioned on the floor. At least one access point can be selectively located within the floor. The position of at least one article of furniture on the floor and location of the access point of the floor can be made at least partially coincident and access to utilities can be provided through the floor to the article of furniture regardless of the position of the article of furniture on the floor.

The present invention also relates to a floor system for providing for access to utilities. The floor system includes a plurality of floor tiles, with at least one of the floor tiles having at least one compartment, and at least one subtile having an access pattern configured to be installed in at least one compartment of at least one floor tile. A floor is formed by selective arrangement of the plurality of floor tiles, with at least one access point for utilities provided by the access pattern of at least one of the plurality of floor tiles. At least one article of furniture is selectively positioned on the floor. At least one access point can be selectively located within the floor. The position of the article of furniture on the floor and location of the access point of the floor are at least partially coincident and access to utilities can be provided through the floor to the article of furniture regardless of the position of the article of furniture on the floor.

The present invention further relates to a floor system for a work environment adapted for distribution of utilities associated with articles such as articles of furniture. The floor system includes a plurality of floor tiles. At least one of the floor tiles provides an access pattern. A floor is formed by selective arrangement of the plurality of floor tiles with at least one access point for utilities provided by the access pattern of at least one of the plurality of floor tiles. At least one article is selectively positioned on the floor. At least one access point can be selectively located within the floor. The position of at least one article on the floor and location of the access point of the floor are at least partially coincident and access to utilities can be provided through the floor to the article regardless of the position of the article on the floor.

BRIEF DESCRIPTION OF THE DRAWINGS

FIG. 1B is a perspective view of the floor system.

FIGS. 5A through 5C are exploded perspective views of the floor system showing the potential orientation of floor tiles.

FIGS. 7A through 7E are top plan views of floor tiles according to alternative embodiments.

FIG. 8 is a top plan view of a floor tile frame according to an alternative embodiment.

FIG. 9 is an exploded perspective view of the floor system according to an alternative embodiment showing the potential orientation of floor tiles.

FIGS. 10A and 10B are exploded perspective views of the floor system according to an alternative embodiment showing the potential orientation of floor tiles.

FIG. 10C is a cross-sectional side elevation view of the floor system of FIGS. 10A and 10B showing a structural support system and passage of utilities taken along line 10C—10C in FIG. 10A.

FIGS. 11A and 11B are exploded perspective views of the floor system according to an alternative embodiment showing the potential orientation of floor tiles.

FIG. 11C is a cross-sectional side elevation view of the floor system of FIGS. 11A and 11B showing a structural support system and passage of utilities taken along line 11C—11C in FIG. 11A.

FIG. 12A is a fragmentary perspective view of a structural support system for the floor system.

FIG. 12B is a cross-sectional side elevation view of the structural support system taken along line 12B—12B in FIG. 12A.

DETAILED DESCRIPTION OF THE PREFERRED EMBODIMENTS

Figure 1A:
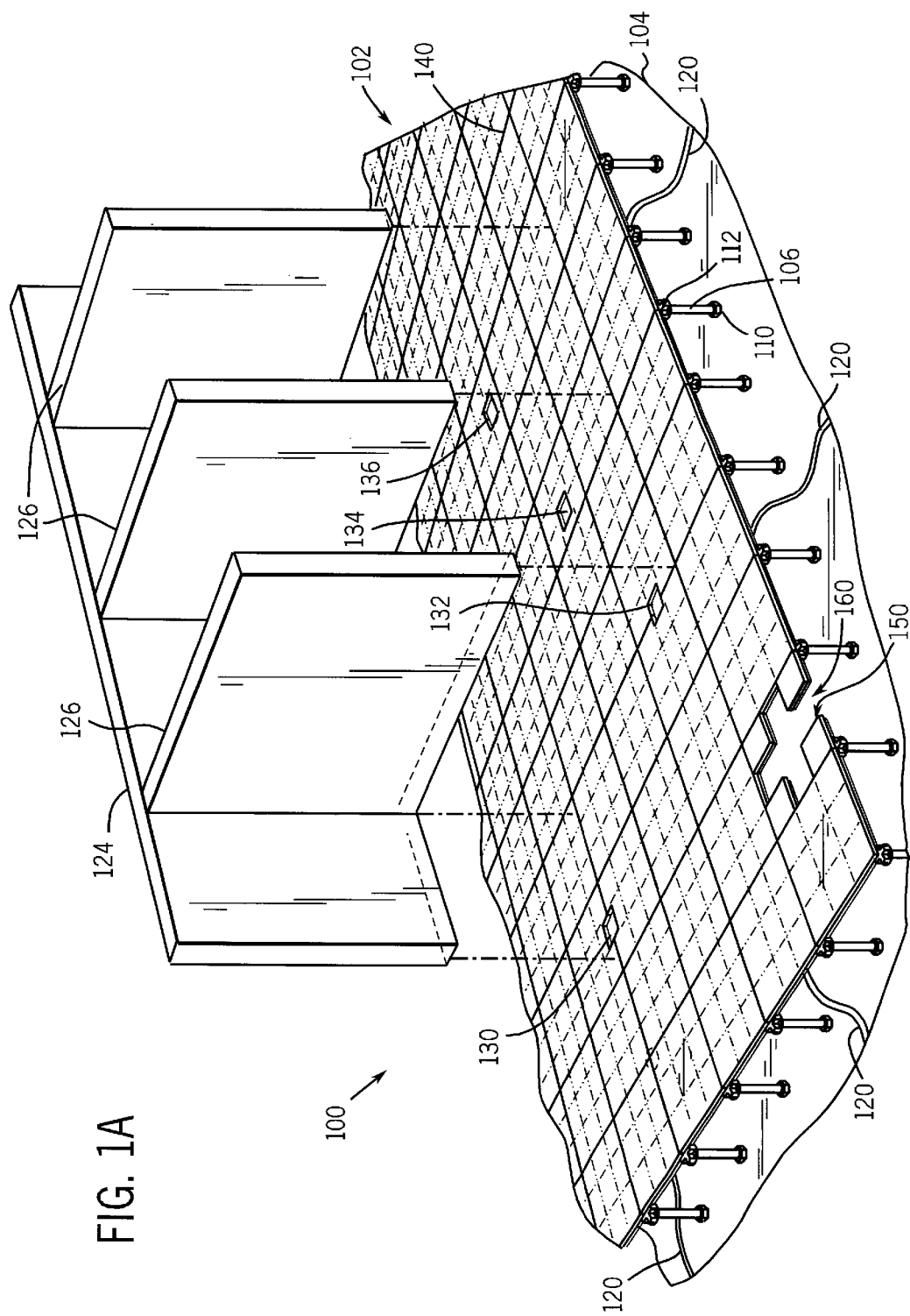
FIG. 1A is an exploded perspective view of a floor system according to a preferred embodiment of the present invention.

Referring to FIGS. 1 through 5, a floor system 100 is shown according to a preferred embodiment of the present invention. Floor system 100, which is configured for use in a work environment or the like according to any preferred embodiment (but may be used in a wide variety of other spaces according to alternative embodiments), provides a raised floor 102 installed above a base floor 104 (e.g. a "subfloor" such as a poured concrete floor). Raised floor 102 is formed of a plurality of floor tiles 140 (e.g. floor panels) which are typically arranged in a grid-like pattern to form a floor surface, typically in a horizontal plane.

As is shown in greater detail in FIGS. 12A and 12B, according to a particularly preferred embodiment, each of floor tiles 140 forming raised floor 102 is supported on base floor 104 by a structural support system. According to any preferred embodiment, the floor tiles and associated structural support system are designed and installed to support the load that may be imposed by persons, articles of furniture and any other occupants that stand or rest directly or indirectly upon the floor tiles (within limits dictated by the structural support system and floor tiles). According to the particularly preferred embodiment shown in FIGS. 12A and 12B, the structural support system includes a plurality of upright stands 107. Each stand 107 includes a base plate 114a (which is shown as a square plate but may be of other shapes) secured to base floor 104 (e.g. by an adhesive) with a lower threaded rod portion 106b and an upper threaded barrel portion 106a; an adjustment or lock nut 110a is mounted to lower threaded rod portion 106b; rotation of adjustment nut 110a on lower threaded rod portion 106b (which is fixed to base plate 114a) raises or lowers upper threaded barrel portion 106a to provide height adjustment for stand 107 (and thus the raised floor).

According to an alternative embodiment shown in other FIGURES, wherein the structural support system includes a stand 106 secured within base floor 104. Height adjustment of stand 106 is provided by rotating stand 106 (which has a lower threaded end) to a greater or lesser length of threaded engagement within a threaded sleeve 108 inserted in a cavity 114 in base floor 104. Securing of stand 106 to base floor 104 is provided by lock nut 110. Other types of suitable structural support or mounting systems or floor anchors and height adjustment arrangements that may be used for alternative embodiments commercially available and/or are known to those skilled in the art who may review this disclosure.

According to the preferred embodiment, stand 107 also includes a cap 112 mounted on top of barrel portion 106a onto which floor tiles 140 are installed. (Cap 112 is mounted directly on top of stand 106 according to alternative embodiments.) As shown in FIGS. 12A and 12B, cap 112 of stand 107 (or cap 112 of stand 106 in other FIGURES) is circular with a set of cutouts or notches 116 formed in association with a crossmember structure 118. As shown, four floor panels may be supported at their intersecting corners by the cap of each stand. A lower perimeter edge 144 of floor tile 140 nests or seats (i.e. rests or is supported) within each notch 116 of cap 112; an outer peripheral flap 142 of floor tile 140 is supported on the top of crossmember structure 118 of cap 112. According to a particularly preferred embodiment, when the floor system is installed, the perimeter of each of the upper surface edges of each floor panel are adjacent to the perimeter of the upper surface edges of an adjacent floor panel so as to provide a secure and relatively close fit for the floor panels (see FIG. 12B) as well as a raised floor presenting a uniform appearance (with "seams" between floor panels that are relatively unobtrusive). According to any preferred or alternative embodiments, any of a wide variety of other types of structural support systems of suitable functionality and strength may be employed for the floor tiles (i.e. with stands of other configurations or without stands, installed at various heights with respect to the base floor, with caps of other configurations or without caps, etc.).

According to any preferred embodiment, articles such as articles of furniture will be supported by the raised floor of the floor system. For example, in FIGS. 1A and 1B, articles of furniture shown as "systems furniture" in the form of a panel wall system 122 is arranged on raised floor 102 (a table 123 and chairs 125 are shown schematically in FIG. 1B). According to alternative embodiments, the articles of furniture and other articles may be of any type used in a work environment or space, including but not limited to panel walls, cabinets, workstations, worksurfaces, desks, tables, chairs or other seating products, carts, posts or other utility or activity products, storage products, bins, shelving units, frames or other structures, lighting products, equipment, etc. (The term "article" or "article of furniture" is intended to be used in the broadest sense, and would also include any other type of mechanical or electronic or like equipment or system, HVAC system or element (such as an inlet, outlet or diffuser), device, machine, instrument, other object or system or the like that occupies or is used on the floor of a work environment). The articles may be freestanding, mounted or secured to the floor and/or to internal walls of the work environment or space or secured together, depending upon needs and nature of the particular application or installation.

According to any preferred embodiment, the articles of furniture associated with the floor system may be configured to support connectivity for utilities (e.g. through associated internal and/or external passages), for example, telephony, data, power, HVAC, piping, or any other signals or services. As shown in the FIGURES, utilities may be provided by wires or cables 120, which typically run beneath raised floor 102 and above base floor 104 (e.g. out of sight in ordinary use). In order to allow for interconnection or passage of utilities between or through the articles of furniture, the raised floor of the floor system is configured to provide an access pattern including one or more access points (shown as apertures 130 in FIGS. 1 and 2). As shown in the FIGURES, utilities shown as cables 120 pass in either direction through the access points (e.g. apertures 130) through raised floor 102 and can be routed into passages within or associated with various articles of furniture (see FIGS. 1 through 3).

According to a particularly preferred embodiment shown in FIGS. 1A through 5C, floor system 100 includes four types of floor tiles 140a, 140b, 140c and 140d. Floor tile 140a is solid, with no aperture (i.e. access point). Floor tile 140b, shown in FIG. 5A, includes an edge aperture 141. Floor tile 140c, shown in FIG. 5B, includes a central aperture 144 (slightly offset). Floor tile 140d, shown in FIG. 5C, includes a lateral aperture 146. During installation of raised floor 102, any of four floor tiles 140a through 140d may be selectively and interchangeably installed in any of four rotational positions (see FIGS. 5A through 5C) at a particular location. As a result of the possible combinations of rotational positions and locations, interchangeable floor tiles 140a through 140d may be represented by an "effective" floor tile (shown by reference numeral 150) having an "effective" access pattern 160 (formed in base 147). As is apparent from FIG. 4, the size and shape of "effective" access pattern 160 of "effective" floor tile 150 is determined by the superimposition of each of apertures 141, 144 and 146 of each of floor tiles 140b, 140c and 140d in each of the possible rotational positions. (As shown, for convenience of installation and configuration, but not of necessity, "effective" floor tile is of a symmetrical arrangement; it should be noted that according to alternative embodiments, where a set of floor tiles that are not rotatable, or are not wholly interchangeable, is used, the arrangement of "effective" floor tile may not be symmetrical.)

According to any preferred embodiment, for example as shown in FIGS. 1A through 5C floor system 100 is configured so that the arrangement or placement of articles of furniture on raised floor 102 is not constrained by the access pattern, i.e. the location of access points 130 for utilities (e.g. cables 120). During installation of raised floor 102, the selection and position of the floor tiles will dictate the location of the access points within the floor system. The location of the access points within the floor system thereby can be matched to the location of passages for utilities that are associated with the articles of furniture to be arranged or installed on the floor system.

As shown in FIGS. 1A and 1B, panel wall system 122 includes a primary wall panel 124 (e.g. "module" or "spine" panel) and secondary wall panels 126 (e.g. "off-module" panel). Primary wall panel 124, as well as each of secondary wall panels 126, are configured with internal passages for cables 120. Primary wall panel 124 and secondary wall panels 126 are arranged in an orthogonal orientation with respect to floor system 100. As a result of the selection and rotational position of the floor tiles, access points shown as apertures 130, 132, 134, and 136 provide for passage of cables 120 (or other utility distribution elements) from beneath raised floor 102 directly into the passages within primary wall panel 124 and secondary wall panels 126, respectively.

Figure 2:
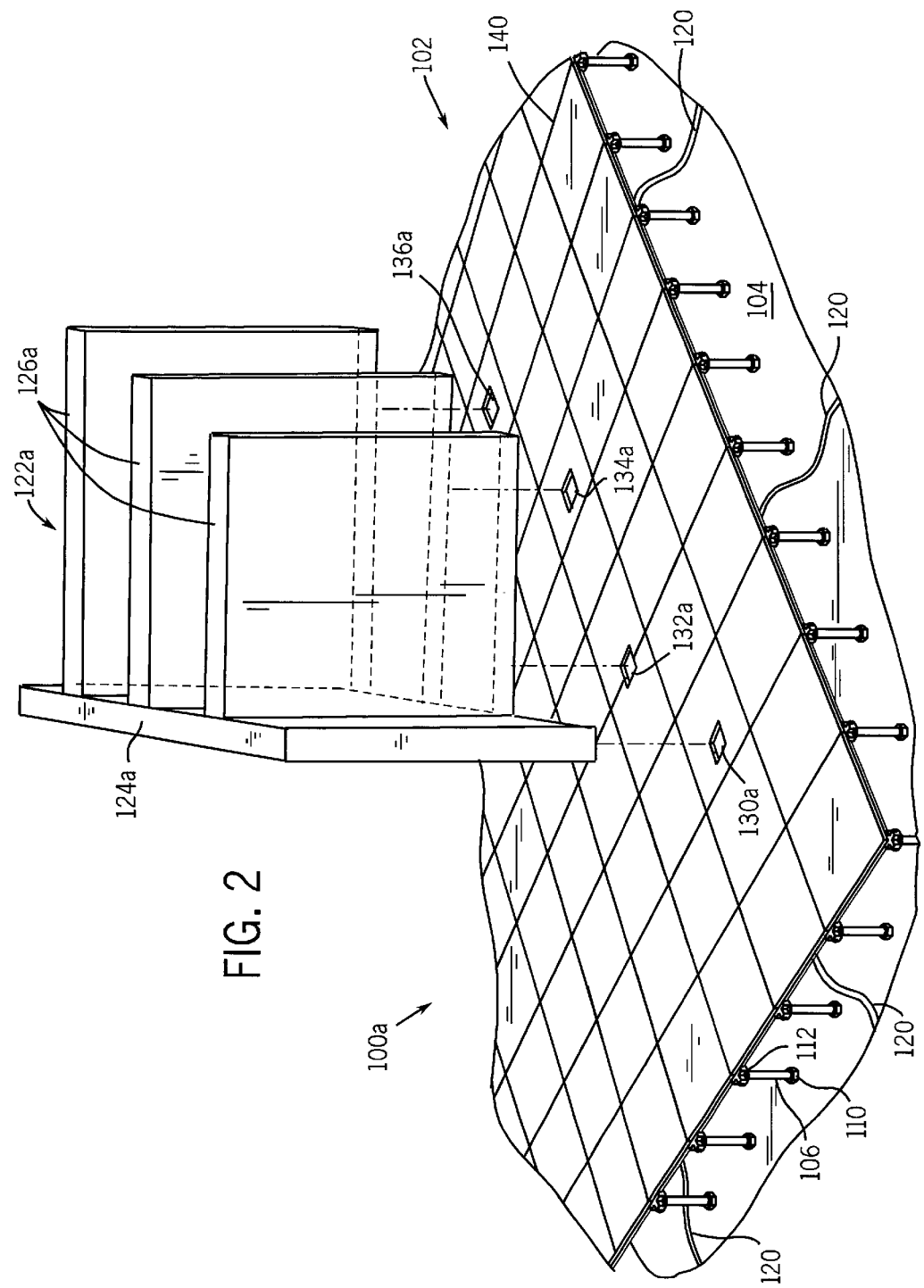
FIG. 2 is an exploded perspective view of the floor system according to an alternative embodiment.

As shown in FIG. 2, panel wall system 122a also includes a primary wall panel 124a and secondary wall panels 126a, which are also configured with internal passages for cables 120. However, primary wall panel 124a and secondary wall panels 126a are arranged in an angled or skewed orientation with respect to floor system 100. Nevertheless, as a result of the selection and rotational position of the floor tiles (e.g. which are of a type shown in FIGS. 1A and 1B), access points shown as apertures 130a, 132a, 134a, and 136a provide for passage of cables 120 (or other utilities) from beneath raised floor 102 directly into the passages within primary wall panel 124a and secondary wall panels 126a, respectively.

Figure 3:
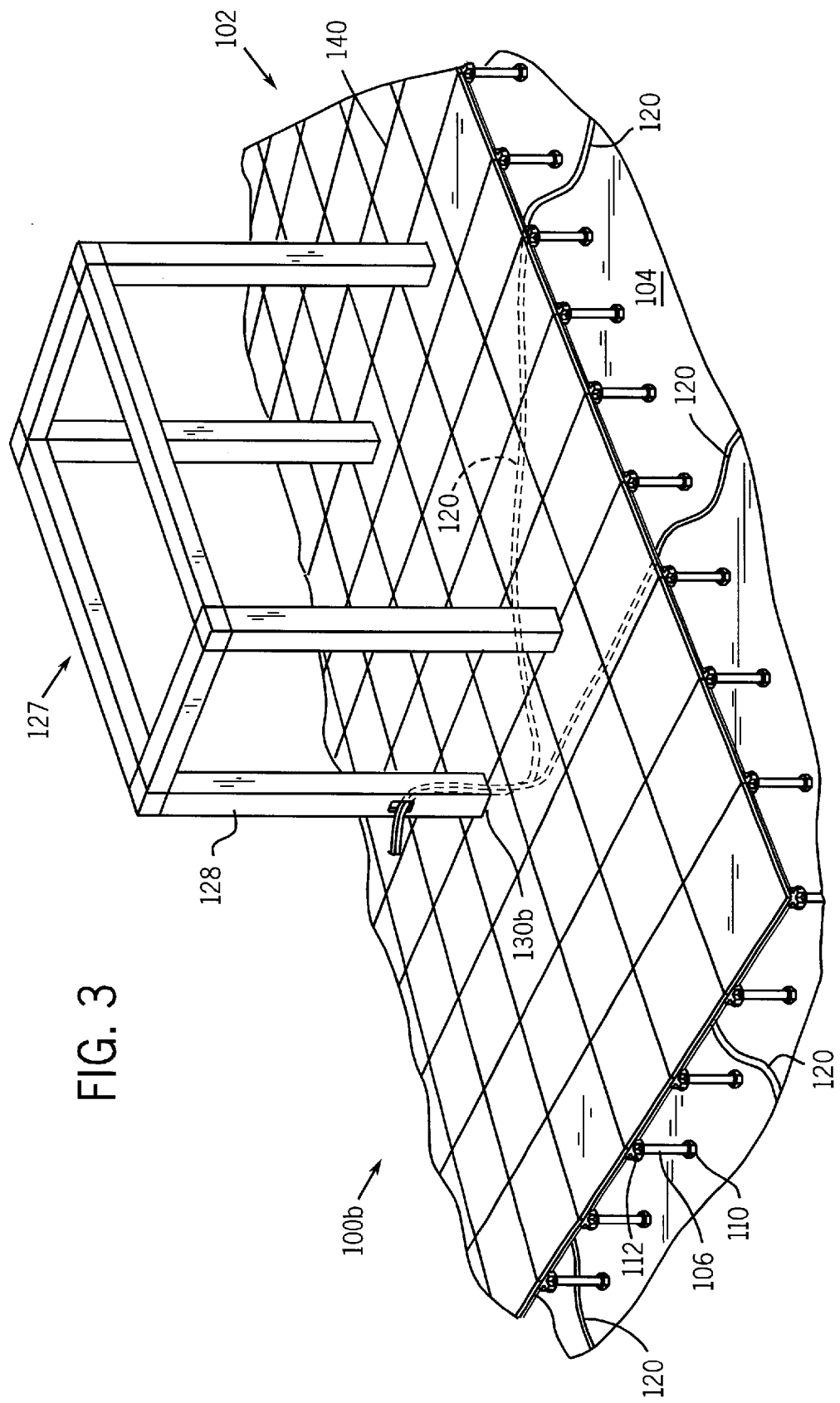
FIG. 3 is a perspective view of the floor system according to an alternative embodiment.
Figure 4:
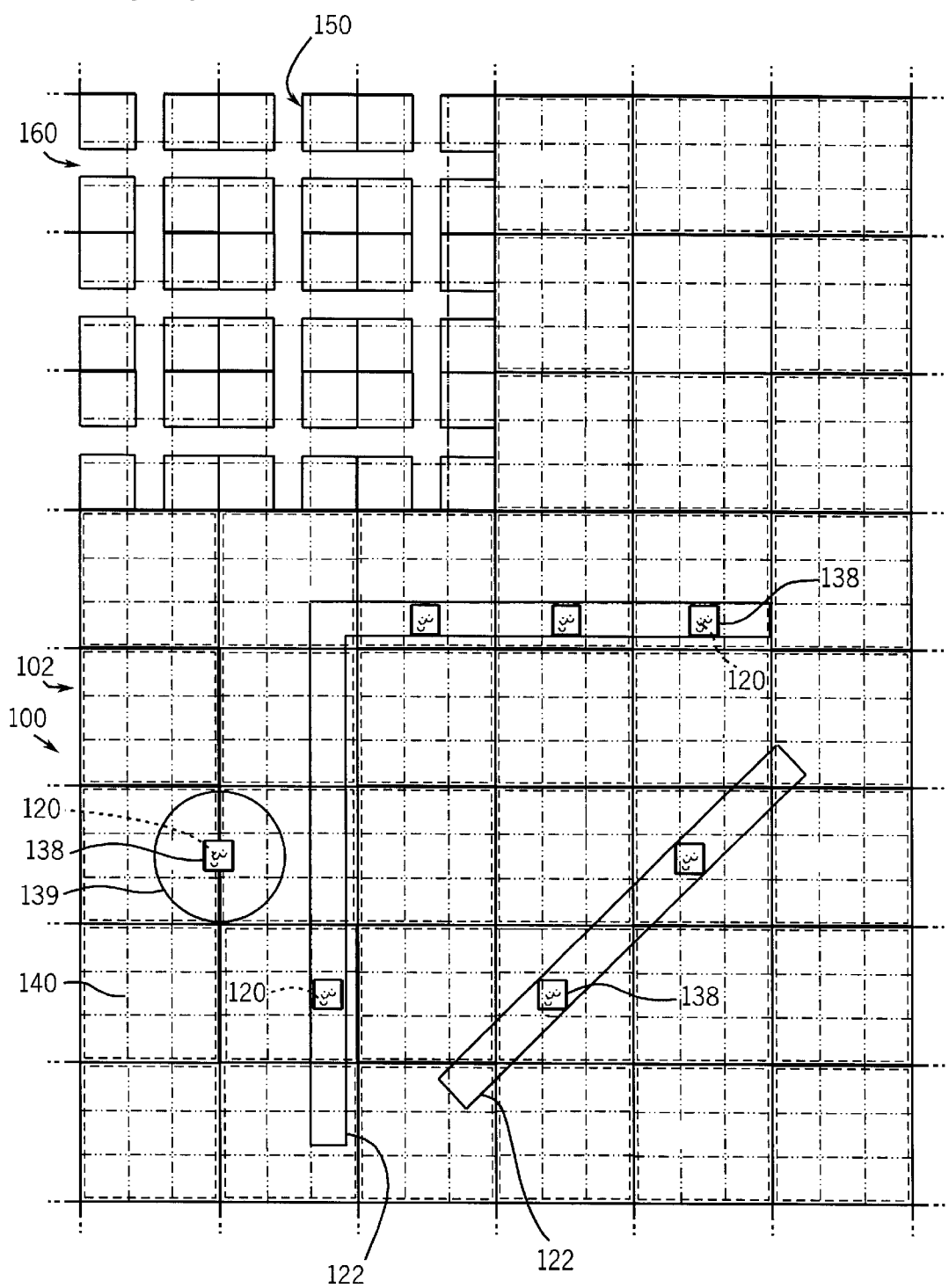
FIG. 4 is a schematic top plan view of the floor system.

The flexibility provided by the floor system is illustrated by the exemplary embodiments of FIGS. 1A and 1B, 2 and 3, as well as in FIG. 4 (which is a top plan view of the floor system showing other arrangements for access points 138 along with "effective" floor tiles 150 with "effective" access pattern 160). The positions of apertures 130, 132, 134 and 136 in floor system 100 accommodate the position of panel wall system 122 (FIGS. 1A and 1B); the positions of apertures 130a, 132a, 134a and 136a in floor system 100a accommodate the position of panel wall system 122a (FIG. 2). According to any preferred embodiment, the floor system can readily be configured or reconfigured to accommodate any arrangement or position of articles of furniture (i.e. however selectively positioned). For example, as shown in FIG. 3, the floor system can also be configured with an access point 130b located as to provide a structure shown as frame 127 with access to cables 120 through at least one of its legs 128. FIG. 4 also shows a circular base 139 (or "footprint") for an article of furniture such as a table or utility post positioned over an access point shown as aperture 138. In other applications, other articles or combinations of articles having different shapes and sizes could be positioned on the raised floor.

The "coverage" of the access pattern for the floor system depends upon the potential locations of the access points corresponding to the "effective" floor tile formed by the superimposition of all floor tiles within the floor system (i.e. the set of wholly or partially interchangeable floor tiles that is considered as the floor system). When being installed or reconfigured, the raised floor of the floor system provides for potential locations of access points for distribution of utilities in a predetermined access pattern; the actual locations of access points are determined by the selection and arrangement of the floor tiles as actually installed to form the raised floor. As shown in FIG. 4, floor system 100 (i.e. the set of four floor tiles shown in FIGS. 5A through 5C) provides an uninterrupted (continuous) grid of potential access points for articles of furniture across raised floor 102. According to any preferred embodiment, the location of access points is made at least partially coincident with the position of the articles of furniture (i.e. the passages for utilities in certain articles of furniture that are so configured). In this manner, the position or arrangement of the articles of furniture is not constrained by access to utilities through the raised floor.

According to other exemplary embodiments, such as those shown in the remaining FIGURES, the floor system may provide for an access pattern of potential access points covering virtually the entire surface of the raised floor. (A wide variety of other floor tile configurations are possible according to other alternative embodiments that provide an access pattern with more or less coverage, to varying degrees.) According to any preferred embodiment, the floor system will provide for an access pattern of sufficient coverage (density and/or granularity) for the particular application so that articles of furniture may be "linked" to utilities regardless of their position or location on the raised floor. (The "density" of the access pattern may be controlled by the location of the access points on the floor tile; the "granularity" of the access pattern may be controlled by the size of the access points.)

Where necessary or useful, any of the access points can be provided either wholly or partially with a suitably-shaped plug (shown in FIG. 5B) (e.g. in the form of a grommet or of a "blind" plug, i.e. without or with passage or slot, perhaps formed of rubber or plastic, or the like) so that any portion of the access point that is not intended to be visible or exposed (for example, after the articles of furniture have been arranged) will be covered and/or so that the cables are secured within the access point. (According to an exemplary embodiment shown in FIG. 5B, a compliant plastic plug 144a having a central slot 145 is provided for aperture 144 of floor tile 140.)

Figure 6:
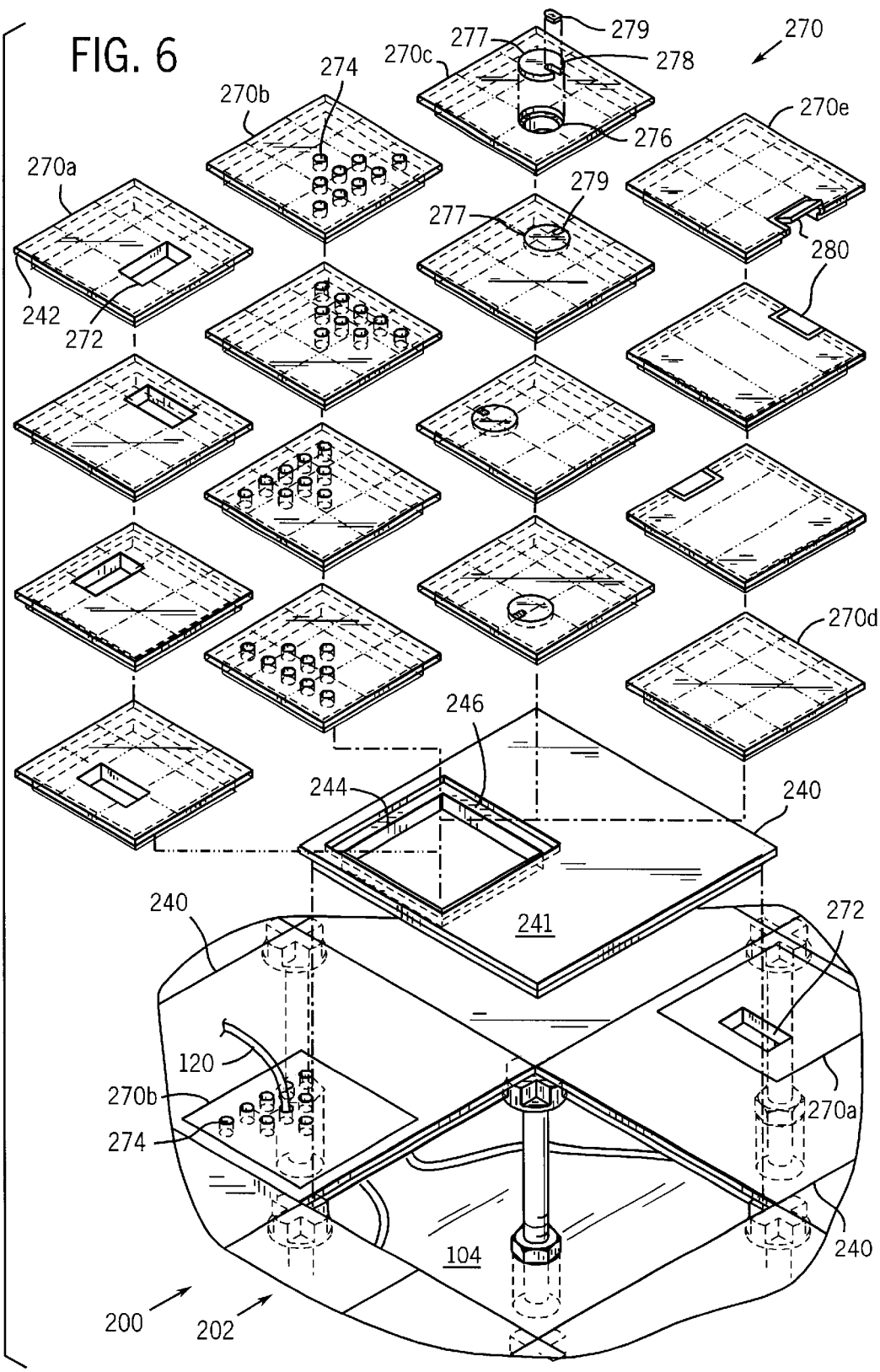
FIG. 6 is an exploded perspective view of the floor system according to an alternative embodiment showing the potential orientation of floor tiles.

Referring to FIG. 6, an alternative embodiment floor system 200 is shown using a carrier or tray tile 240 (in the place of the standard floor tile). Tray tile 240, which is configured to be installed within floor system 200 in any of four rotational positions, has a solid base and an offset aperture 246 into which a floor subtile 270 may be installed. Each subtile 270, which is configured to be interchangeably installed within tray tile 240 in any of four rotational positions, is supported by a peripheral flap 242 on a ledge 244 around the perimeter of aperture 246. Each of floor subtiles 270 also provides a distinctive set of one or more access points for utilities. (As with any exemplary embodiment, the overall or "effective" access pattern of the floor system is predetermined by the possible configuration of the available floor subtiles.)

By way of example but not of limitation, a variety of configurations of floor subtiles (and access points or patterns) are shown in FIGS. 6 and 7A through 7E. For example, subtile 270a includes a slot 272. Subtile 270b includes a plurality of holes 274 (in a triangular pattern). Subtile 270c includes an offset circular hole 276 with a cap 277 (that can be indexed in a variety of orientations); cap 277 has a cutout 278 that can be filled in whole or in part by a plug 279 (or grommet). Subtile 270d does not provide for any access points. Subtile 270e includes an edge aperture with cover or flap 280 (e.g. made of a resilient or semi-rigid plastic material or the like) that can be lifted to provide for access to utilities. Subtile 270f includes a central circular hole 267b with a cap 277 (seated on a rim that can be indexed in a variety of orientations); cap 277 has a cutout 278 that can be filled in whole or in part by a plug 279 (or grommet).

Referring to FIGS. 8 and 9, an alternative embodiment floor system 300 is shown using a carrier or frame tile 340, similar in purpose to tray tile 240 of FIG. 6. (As will become apparent to those of skill in the art who review this disclosure, the arrangement of the tray tile or frame tile may be modified to include one or more apertures in a wide variety of suitable shapes, internal orientations and configurations.) Frame (tray) tile 340, which is configured to be installed within floor system 300 in any of four rotational positions, has a frame 341 with a set of four apertures 346 into each of which floor subtiles 370 may be installed. Each floor subtile 370, which is configured to be interchangeably installed within tray (frame) tile 340 in any of four locations and any of four rotational positions, is supported by a peripheral flap 342 on frame 341 and around the perimeter of aperture 346.

By way of example but not of limitation, a variety of configurations of floor subtiles are shown in FIG. 9, some of which are similar to the floor tiles and subtiles shown according to other exemplary embodiments. Subtile 370a includes a rectangular slot 372. Subtile 370b includes a plurality of holes 374. Subtile 370c includes an offset circular hole 375 with a cap 377 (that can be indexed in a variety of orientations); cap 377 has a cutout 378 that can be filled in whole or in part by a plug 379 (or grommet). Subtile 370d is solid, with no aperture (i.e. access point). Subtile 370e includes an edge aperture 380. Subtile 370f includes a lateral aperture 376a. Subtile 370g includes a central aperture 376b (slightly offset). (As shown by comparing FIGS. 5A through 5C and FIG. 9, the floor tiles of one embodiment may function in a similar manner to the floor subtiles of other embodiments.)

Figure 10B:
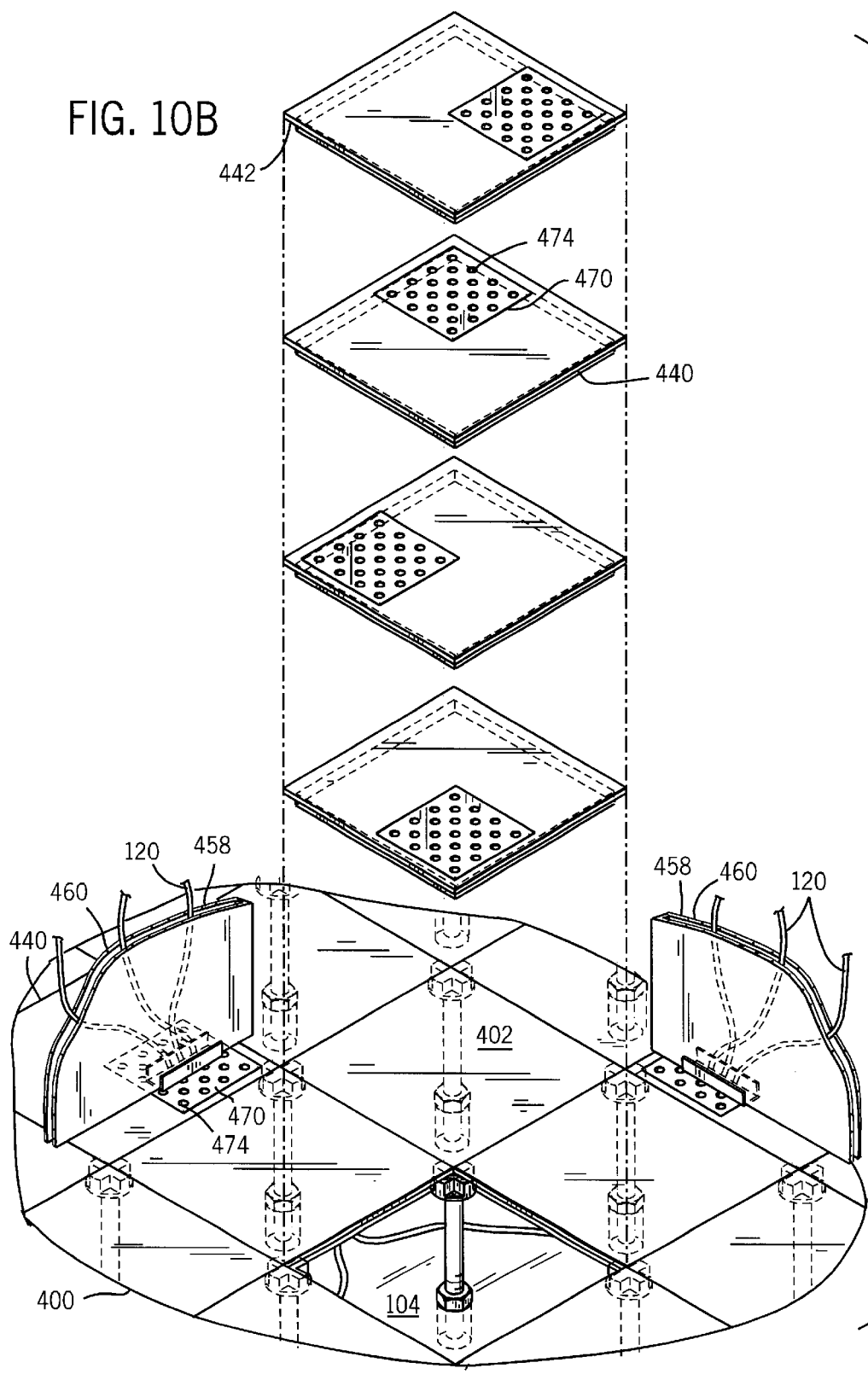

Referring to FIGS. 10A through 10C, an alternative embodiment floor system 400 is shown using a carrier or tray tile 440 (similar to tray tile 240 shown in FIG. 6) with a peripheral flap 442. (According to alternative embodiments, other arrangements, such as the frame tile 340 shown in FIG. 9, could be used.) As shown in FIG. 10B, floor subtile 470, which is configured to be installed within an aperture 446 in a base 441 of tray tile 440 in any of four rotational positions, includes a plurality of access, holes 474 (in a generally symmetrical offset grid pattern). Floor system 400 also includes a mounting guide 452 having a channel section 454 into which a panel wall 460 may be fitted with retaining plugs 456 (projecting downwardly) which may be fitted into access holes 474. By virtue of mounting guide 452, panel wall 460 may be secured to raised floor 402.

As shown in FIG. 10C, retaining plugs 456 of mounting guide 452 are hollow so that utilities shown as cables 120 may pass from beneath raised floor 402 through access holes 474 of subtile 470 through mounting guide 452 and into an internal passage or space 458 within panel wall 460. Floor system 400 provides not only for flexibility in the location of access points for utilities but also for flexibility in the positioning and securing of panel wall 460 to raised floor 402. In any event, the location of panel wall 460 is not constrained by floor system 400 (given the range of predetermined positions). According to alternative embodiments, the plurality of holes in the subtile could be arranged in other suitable patterns for a particular application (e.g. in an asymmetrical pattern).

Figure 11A:
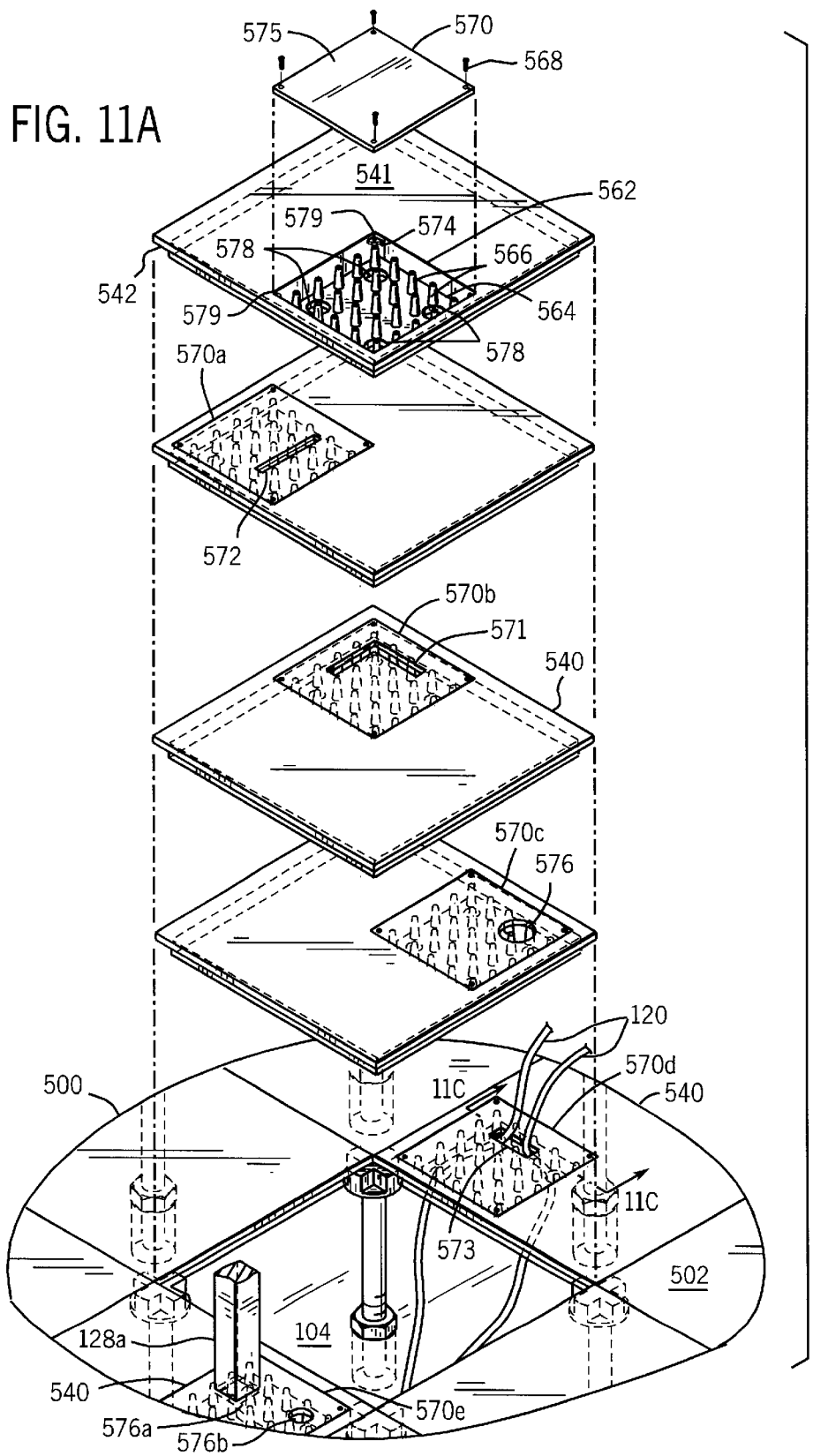

Referring to FIGS. 11A through 11C, an alternative embodiment floor system 500 is shown using a carrier tile 540 (similar to tray tile 340 shown in FIG. 6.) Carrier tile 540, which is supported by cap 112 of stand 106 at a peripheral flap 542, includes a compartment 562 into which a floor subtile 570 is configured to be installed in any of four rotational positions. Compartment 562 of carrier tile 540 has a base 564 including a plurality of upward projections shown as a system of posts 566 which provide support for subtile 570. Subtile 570, which can be made from a sheet of any sufficiently strong and durable material (preferably a rigid plastic material of suitable thickness), is secured within compartment 562 of carrier tile 540 by a set of fasteners shown as screws 568. Screws 568 are inserted through subtile 570 and are threaded into holes 579a at mounting areas shown as mounting tabs 574 in corners 579 of compartment 562. Access to utilities is provided through apertures 578 at base 564 of compartment 562 (at least one aperture of suitable size is required). According to any preferred embodiment, as shown in FIG. 11C, posts 566 are of a size and shape and arranged in a pattern that provides sufficient structural support for subtile 570 but that does not impede the passage of cables 120 through raised floor 502.

Subtile 570 originally has the form of a solid sheet 575 but can be provided with access points for utilities shown as cables 120 by providing a cutout arrangement of suitable size, shape and placement as required for the particular application. The cutout arrangement can be formed in the subtile before or during installation of the floor, when articles of furniture are positioned and/or when the floor is reconfigured. By way of example but not of limitation, subtile 570*a* is provided with an offset elongated slot cutout 572, subtile 570*b* is provided with an "L"-shaped cutout 571, subtile 570*c* is provided with an offset circular cutout 576, subtile 570*d* is provided with an offset rectangular cutout 573, and subtile 570*e* is provided both with an offset circular cutout 576*b* and an offset square cutout 576*a* (over the top of which a structural member 128*a* of an article of furniture has been positioned). As is apparent, the access pattern provided by the subtiles of floor system 500 is particularly flexible, and preferably can be modified during installation of floor system and/or positioning of articles of furniture within the work environment or space (i.e. "field cut"). The position of the article of furniture is effectively unconstrained by the floor system.

As is apparent from the exemplary embodiments, the floor subtiles of certain embodiments fit and function in a similar manner to the floor tiles of other embodiments and are therefore conceptually interchangeable provided they are of proper size and strength for a particular application. According to any preferred embodiment, the floor tiles and subtiles fit together to provide a structurally sound and relatively seamless raised floor.

While the exemplary preferred and alternative embodiments of the floor system show floor tiles (e.g. including tray tile, frame tile, carrier tile, other tile, etc.) and subtiles having a square shape, other shapes could be used according to additional alternative embodiments of the present invention. According to any preferred embodiment, the floor tiles and/or subtiles, although readily reconfigurable, will fit together in any suitable arrangement to provide a structurally sound and relatively seamless raised floor while providing an access patterns or access pattern for distribution of utilities that is suitable for the application.

Although only a few, exemplary embodiments of the floor system have been described in detail above, those skilled in the art who review this disclosure will readily appreciate that many modifications are possible in the exemplary embodiments without materially departing from the novel teachings and advantages of the present invention. For example, the floor system is not limited by type or nature of the articles of furniture or the arrangement of utilities above or below the raised floor. (In alternative embodiments, utilities may include a wide variety of services, including those provided through cables, conduits, pipes or ducts, layers, levels, channels, paths, passages, raceways, etc.) Neither is the floor system limited by the specific size, scale, shape or fit of floor tiles and subtiles (which may be based on or adapted from existing floor systems such as those available from Tate Access Floors, Inc. of Jessup, Md., Interface Architectural Resources of Kennesaw, Ga., and/or by other suppliers or standards), the manner of installation of the floor system, the nature of the raised floor (whether a thick raised floor, thin raised floor or other type of floor), the height and structural support system for the raised floor, or whether the floor tiles and subtiles are uncovered or covered by vinyl, carpet, etc. Access points, apertures or access patterns of any size or shape may be provided in the floor tiles or subtiles. Any preferred embodiment of the floor system will include floor tiles and subtiles of suitable structural rigidity and strength that have been interconnected to provide a raised floor that meets the requirements for loading as well as noise, efficiency and regulatory compliance.

Accordingly, all such modifications are intended to be included within the scope of the invention as defined in the following claims. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred embodiments without departing from the spirit of the invention as expressed in the appended claims.

What is claimed is:

1. A floor system for providing access to utilities in a work environment, the floor system comprising:
   a plurality of floor tiles having a top surface, at least one of the plurality of floor tiles having at least one aperture in the top surface and at least partially offset from the center of the at least one of the plurality of floor tiles;
   at least one subtile having at least one access opening at least partially offset from the center of the subtile and configured to be installed in the at least one aperture of at least one of the plurality of floor tiles;
   wherein a floor is formed by selective arrangement of the plurality of floor tiles and selective arrangement of the at least one subtile within the floor to provide access to utilities on the floor.

2. The floor system of claim 1 wherein the at least one aperture of the plurality of floor tiles comprises a compartment.

3. The floor system of claim 1 wherein the access opening comprises at least three holes.

4. The floor system of claim 3 wherein the at least three holes are arranged in a triangular pattern.

5. The floor system of claim 1 further comprising a cover configured to substantially cover the at least one access opening.

6. The floor system of claim 5 wherein the cover includes an opening to provide access to utilities.

7. The floor system of claim 1 further comprising a cap configured to substantially cover the at least one access opening.

8. The floor system of claim 7 wherein the cap includes a cutout to provide access to utilities.

9. The floor system of claim 8 wherein the cap can be selectively rotated to selectively position the cutout.

10. The floor system of claim 1 wherein the at least one access opening includes an edge aperture on at least one side of the at least one subtile.

11. The floor system of claim 10 further comprising a cover configured to substantially cover the edge aperture.

12. The floor system of claim 11 wherein the cover comprises a resilient plastic material to allow utilities to pass through the edge aperture.

13. The floor system of claim 1 wherein the at least one subtile includes a peripheral flange that is supported by the tile.

14. The floor system of claim 13 wherein the aperture in the at least one of the floor tiles includes a ledge to support the flange.

15. The floor system of claim 1 further comprising a plurality of pedestals supporting and raising the plurality of floor tiles above a base floor of a work environment.

16. A floor system for installation and use in a work environment, the floor system comprising:
   a plurality of floor tiles, at least one of the floor tiles having a plurality of apertures;
   a plurality of subtiles having at least one access opening at least partially offset from the center of the subtile and configured to be installed in the plurality of apertures of at least one of the plurality of floor tiles;
   wherein a floor is formed by selective arrangement of the plurality of floor tiles and selective arrangement of the plurality of subtiles within the floor tiles to provide a plurality of access points for utilities through the floor.

17. The floor system of claim 16 wherein the at least one aperture of the plurality of floor tiles comprises a compartment.

18. The floor system of claim 16 wherein the access opening comprises at least three holes.

19. The floor system of claim 18 wherein the at least three holes are arranged in a triangular pattern.

20. The floor system of claim 16 further comprising a cover configured to substantially cover the at least one access opening.

21. The floor system of claim 20 wherein the cover includes an opening to provide access to utilities.

22. The floor system of claim 16 further comprising a cap configured to substantially cover the at least one access opening.

23. The floor system of claim 22 wherein the cap includes a cutout to provide access to utilities.

24. The floor system of claim 23 wherein the cap can be selectively rotated to selectively position the cutout.

25. The floor system of claim 16 wherein the at least one access opening includes an edge aperture on at least one of the plurality of subtiles.

26. The floor system of claim 25 further comprising a cover substantially covering the edge aperture.

27. The floor system of claim 26 wherein the cover comprises a resilient plastic material to allow utilities to pass through the edge aperture.

28. The floor system of claim 16 wherein at least one of the plurality of subtiles includes a peripheral flange that is supported by the tile.

29. The floor system of claim 28 wherein the aperture in the at least one of the floor tiles includes a ledge to support the flange.

30. The floor system of claim 16, further including a plurality of pedestals supporting and raising the plurality of floor tiles above a base floor of a work environment.

31. A floor system for providing access to utilities in a work environment, the floor system comprising:
   a plurality of floor tiles, at least one of the floor tiles having at least one aperture comprising a compartment and a ledge;
   at least one subtile having at least one access opening and a peripheral flange supported on the ledge of the floor tile;
   wherein a floor is formed by selective arrangement of the plurality of floor tiles and selective arrangement of the at least one subtile within the at least one floor tile to provide access to utilities through the floor.

32. The floor system of claim 31 wherein the access opening comprises at least three holes.

33. The floor system of claim 32 wherein the at least three holes are arranged in a triangular pattern.

34. The floor system of claim 31 further comprising a cover configured to substantially cover the at least one access opening.

35. The floor system of claim 34 wherein the cover includes a hole to provide access to utilities.

36. The floor system of claim 31 further comprising a cap configured to substantially cover the at least one access opening.

37. The floor system of claim 36 wherein the cap includes a cutout to provide access to utilities.

38. The floor system of claim 37 wherein the cap can be selectively rotated to selectively position the cutout.

39. The floor system of claim 31 wherein the at least one access opening includes an edge aperture on at least one side of the at least one subtile.

40. The floor system of claim 39 further comprising a cover configured to substantially cover the edge aperture.

41. The floor system of claim 40 wherein the cover comprises a resilient plastic material to allow utilities to pass through the edge aperture.

42. The floor system of claim 31 wherein the at least one access opening is positioned partially offset from the center of the floor tile.

43. The floor system of claim 42 wherein the at least one access opening is positioned partially offset from the center of the subtile.

44. The floor system of claim 31 wherein the at least one access opening is positioned partially offset from the center of the subtile.

45. The floor system of claim 31 further comprising a plurality of pedestals supporting and raising the plurality of floor tiles above a base floor of a work environment.

46. A floor system for providing access to utilities in a work environment, the floor system comprising:
   a plurality of floor tiles, at least one of the floor tiles having at least one aperture and a ledge;
   at least one subtile having at least one access opening comprising at least three holes and a peripheral flange supported on the ledge of the floor tile;
   wherein a floor is formed by selective arrangement of the plurality of floor tiles and selective arrangement of the at least one subtile within the at least one floor tile to provide access to utilities through the floor.

47. The floor system of claim 46 wherein the at least one aperture of the plurality of floor tiles comprises a compartment.

48. The floor system of claim 46 wherein the at least three holes are arranged in a triangular pattern.

49. The floor system of claim 46 further comprising a cover configured to substantially cover the at least one access opening.

50. The floor system of claim 49 wherein the cover includes a hole to provide access to utilities.

51. The floor system of claim 46 further comprising a cap configured to substantially cover the at least one access opening.

52. The floor system of claim 51 wherein the cap includes a cutout to provide access to utilities.

53. The floor system of claim 52 wherein the cap can be selectively rotated to selectively position the cutout.

54. The floor system of claim 46 wherein the at least one access opening includes an edge aperture on at least one side of the at least one subtile.

55. The floor system of claim 54 further comprising a cover configured to substantially cover the edge aperture.

56. The floor system of claim 55 wherein the cover comprises a resilient plastic material to allow utilities to pass through the edge aperture.

57. The floor system of claim 46 wherein the at least one aperture is positioned partially offset from the center of the floor tile.

58. The floor system of claim 57 wherein the at least one access opening is positioned partially offset from the center of the subtile.

59. The floor system of claim 46 wherein the at least one access opening is positioned partially offset from the center of the subtile.

60. The floor system of claim 46 further comprising a plurality of pedestals supporting and raising the plurality of floor tiles above a base floor of a work environment.

* * * * *